(No Model.)
J. V. MOTTER.
DRIVING MECHANISM.
No. 491,221. Patented Feb. 7, 1893.
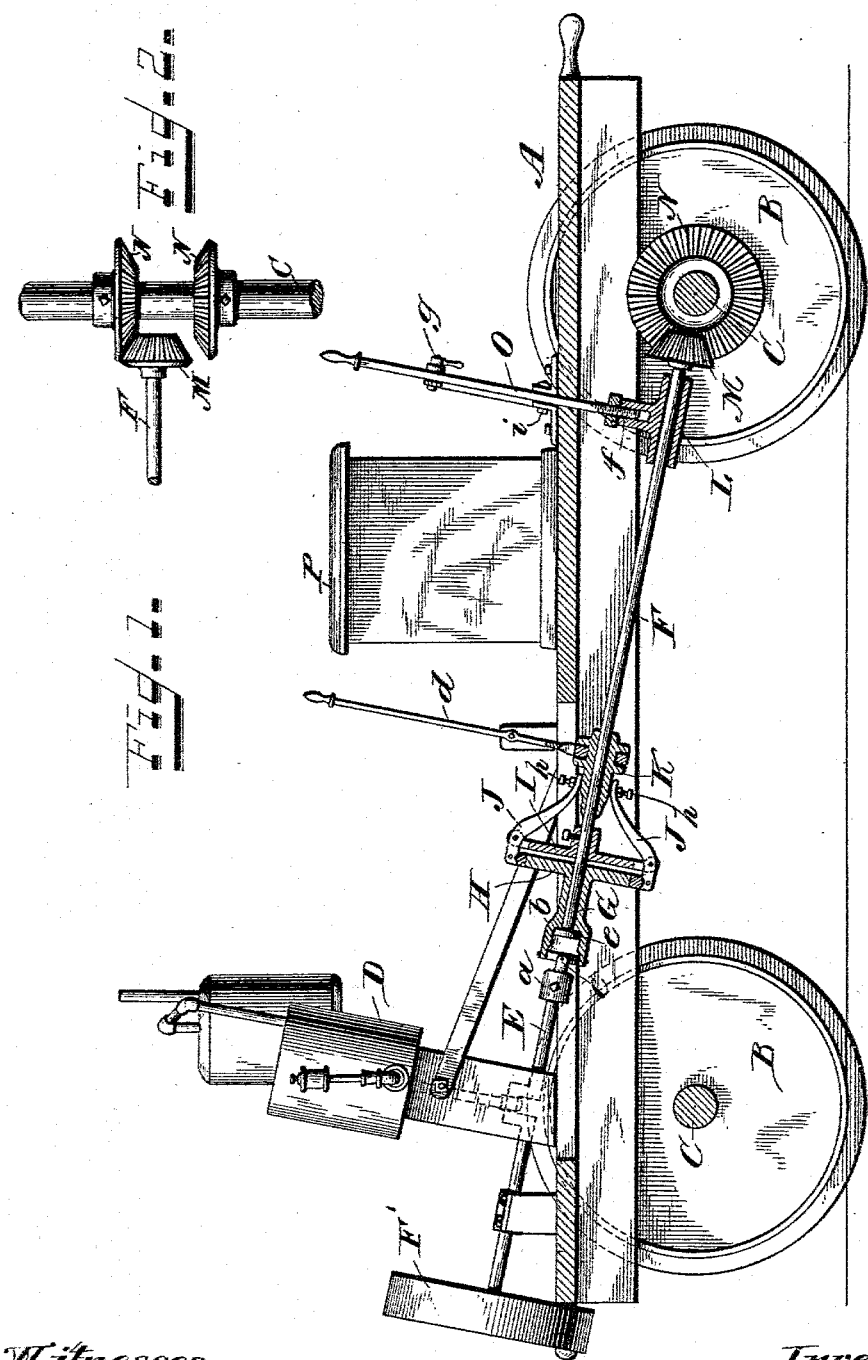
Witnesses.
J. Thomson Cross
Henry Halbert
Inventor.
Jacob V. Motter
by Chas M Beck
his Attorney.

UNITED STATES PATENT OFFICE.

JACOB V. MOTTER, OF BROOKLYN, NEW YORK.

DRIVING MECHANISM.

SPECIFICATION forming part of Letters Patent No. 491,221, dated February 7, 1893.

Application filed September 26, 1892. Serial No. 446,895. (No model.)

*To all whom it may concern:*

Be it known that I, JACOB V. MOTTER, a citizen of the United States, residing at Brooklyn, in the county of Kings and State of New York, have invented certain new and useful Improvements in Driving Mechanism, of which the following is a full, clear, and exact description, reference being had to the accompanying drawings, forming a part of this specification.

My invention relates more particularly to driving mechanism for cars, such as inspection cars, though it is capable of other uses, and it has for its object the improved and simplified construction of the same.

The novelty of my invention will be hereinafter set forth and specifically pointed out in the claims.

In the accompanying drawings: Figure 1 is a central section in side elevation of a car embodying my invention. Fig. 2 is a plan view in detail of the driving gearing.

The same letters of reference are used to indicate identical parts in both figures.

A represents the usual or any suitable car truck with wheels B and axles C. Suitably supported on the truck at one end is a gasoline engine or other suitable motor D whose pitman, as indicated in dotted lines, is connected to a crank on a shaft E inclined to and suitably journaled on the bed of the truck.

F' is a fly wheel upon the rear end of the shaft E whose forward end carries one member $a$ of a universal joint whose opposing member $b$ is a cup-shaped extension of a sleeve G carrying at its rear a circular friction disk H. Inserted through the sleeve G and having its bearing therein is the rear end of a shaft, F, substantially in line with the shaft E, and having its enlarged end $e$ confined in the recess of the cup-shaped extension $b$. Fast upon the shaft F beside the disk H is a dog carrier I in this instance a disk having pivoted in its periphery two or more gripping dogs J adapted to engage the periphery of the disk H to lock the two shafts E, F together. The dogs J have convergent projections to be engaged by a wedging hub K free to slide and carried upon the shaft F while a hand lever $d$ pivoted upon the truck platform and having a fork engaging a circumferential groove in the hub K is employed to shift the hub to engage and release the dogs from the friction disk, as will be readily understood. Set screws $h$ in the convergent ends of the dogs are used to take up wear and regulate the grip. The forward end of the shaft F is journaled through a sleeve L having an upwardly extending interiorly threaded socket $f$ into which is screwed the lower threaded end of a hand lever O pivoted as at $i$ to the truck platform. Fast upon the forward end of the shaft F is a beveled pinion M occupying a position between two other beveled gears N fast upon the adjacent car axle in such manner that the shaft F and pinion M can be shifted by means of the lever O to engage either of the gears N at the will of the operator. By screwing the lever O into the socket $f$ the sleeve L can be vertically adjusted to take up wear and to regulate the position of the pinion N.

P is a seat for the operator located between the levers $d$ and O so that he has ready control of both levers. Of course it is understood that by shifting the lever $d$ the shaft F is locked to or unlocked from the constantly revolving shaft E to start and stop the car while by shifting the lever O the direction of propulsion is reversed. To hold the pinion M locked in mesh with either of the gears I have shown a set screw $g$ engaging a segmentally slotted bracket arm on the car platform, but any other form of lock for the lever might be employed.

Having thus fully described my invention, I claim:

1. A sectional driving shaft, a universal joint for uniting the sections thereof, and an interposed clutch for operatively connecting and disconnecting the sections at will.

2. A sectional driving shaft, a universal joint for uniting the sections thereof, and a clutch comprising a friction disk carried by one of the members of the universal joint and clutch arms carried by one of the shaft sections.

3. A sectional driving shaft, a universal joint for uniting the sections thereof, a clutch comprising a friction disk carried by one of the members of the universal joint and terminating in a sleeve in which one of the shaft sections is inserted, and clutch arms carried by said shaft section.

4. The combination with the shaft F and pinion M of the sleeve L, and the operating lever adjustably connected with said sleeve, substantially as described.

JACOB V. MOTTER.

Witnesses:
J. THOMSON CROSS,
CHAS. M. PECK.